US009340128B2

(12) United States Patent
Arai et al.

(10) Patent No.: US 9,340,128 B2
(45) Date of Patent: May 17, 2016

(54) VEHICLE SEAT

(71) Applicant: TACHI-S CO., LTD., Akishima-shi, Tokyo (JP)

(72) Inventors: Kazuhiro Arai, Okazaki (JP); Daisuke Kikuchi, Okazaki (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 14/489,919

(22) Filed: Sep. 18, 2014

(65) Prior Publication Data

US 2015/0084388 A1    Mar. 26, 2015

(30) Foreign Application Priority Data

Sep. 25, 2013  (JP) ................. 2013-197695
Oct. 29, 2013  (JP) ................. 2013-223801

(51) Int. Cl.
*B60N 2/28* (2006.01)
*B60N 2/60* (2006.01)

(52) U.S. Cl.
CPC ............ *B60N 2/2887* (2013.01); *B60N 2/6009* (2013.01)

(58) Field of Classification Search
CPC .......... B60N 2/28; B60N 2/44; B60N 2/6009; B60N 2/289; B60N 2/286; B60N 2/2887; B60N 2/2893; B60R 7/04
USPC .......... 297/250.1, 253, 37.15, 37.16
See application file for complete search history.

(56) References Cited

U.S. PATENT DOCUMENTS

| | | | |
|---|---|---|---|
| 5,383,708 A * | 1/1995 | Nagasaka et al. | 297/250.1 |
| 5,487,588 A * | 1/1996 | Burleigh et al. | 297/253 |
| 5,816,651 A * | 10/1998 | Feuerherdt | 297/253 |
| 6,082,819 A * | 7/2000 | Jackson | 297/253 |
| 6,601,917 B1 * | 8/2003 | Christopherson | 297/253 |
| 6,799,799 B2 * | 10/2004 | Maier et al. | 297/253 |
| 7,533,934 B2 * | 5/2009 | Foelster et al. | 297/253 |
| 8,182,034 B2 * | 5/2012 | Glance | 297/253 |
| 2002/0043839 A1 * | 4/2002 | Hirota | 297/253 |
| 2007/0080568 A1 * | 4/2007 | Nakagawa et al. | 297/253 |
| 2009/0273215 A1 * | 11/2009 | Barker et al. | 297/253 |
| 2013/0221715 A1 * | 8/2013 | Mantke et al. | 297/217.1 |
| 2013/0328369 A1 * | 12/2013 | Mo | 297/250.1 |

FOREIGN PATENT DOCUMENTS

| | | |
|---|---|---|
| DE | 20006692 U1 | 8/2001 |
| DE | 10044621 C1 | 2/2002 |
| DE | 102006008663 A1 | 1/2007 |
| DE | 102005057188 A1 | 5/2007 |
| FR | 2975643 A1 * | 11/2012 ............ B60N 2/44 |
| JP | 2008105580 A | 5/2008 |

OTHER PUBLICATIONS

Extended European Search Report corresponding to Application No. 14181898.9-1758; Date of Mailing: Jan. 13, 2015.

* cited by examiner

*Primary Examiner* — Beth Stephan
(74) *Attorney, Agent, or Firm* — Cantor Colburn LLP

(57) ABSTRACT

In the left and right sides of the bezel, guide grooves are made, extending straight in the front-back direction. The cap has hinge pins, which are fitted in the guide grooves and which can slide along the guide grooves. Control pins protrude inward from the left and right sides of the bezel, and may abut on the back of the cap covering the opening of the bezel. If the cap is pushed, sliding the hinge pins along the guide grooves, the back of the cap slides on the control pins, and the cap swings around the hinge pins. As a result, the cap jumps up and is stored into the bezel.

11 Claims, 13 Drawing Sheets

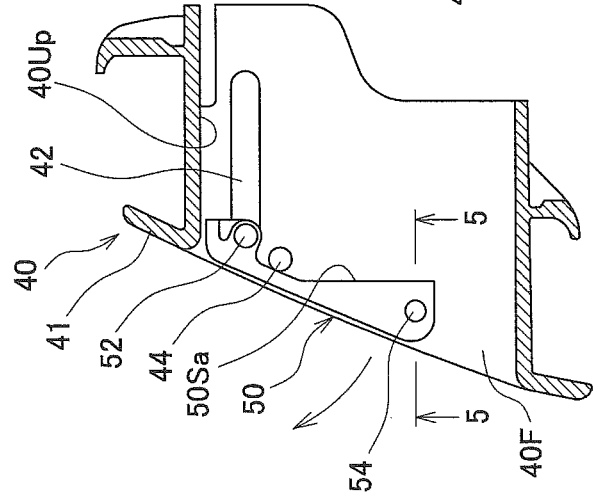
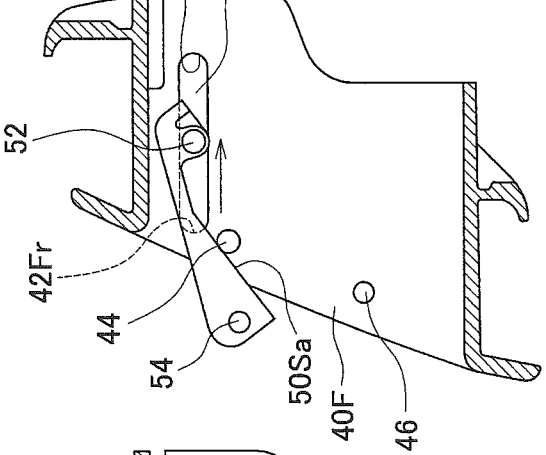
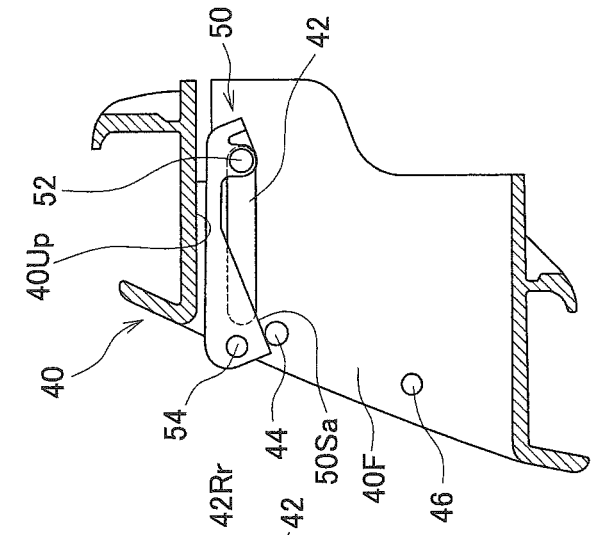

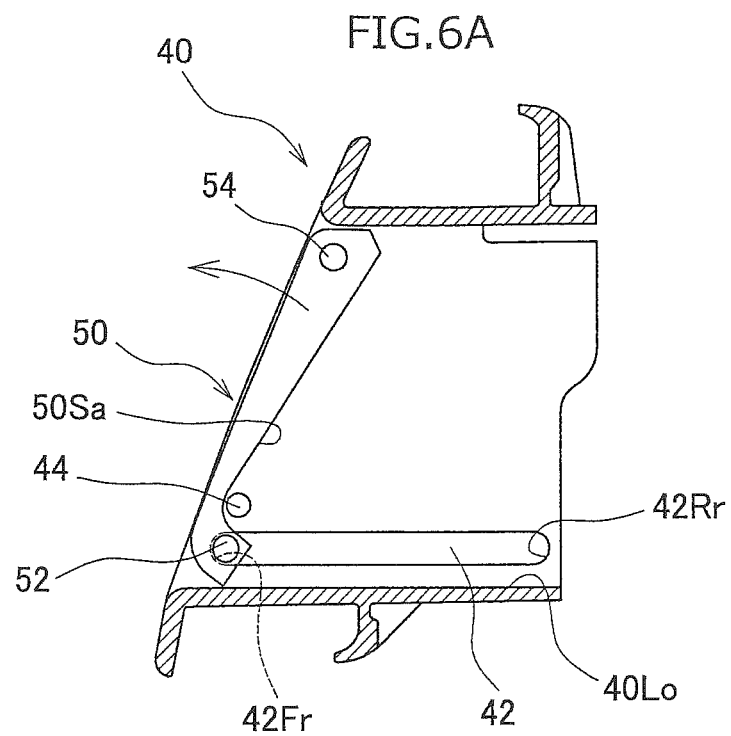
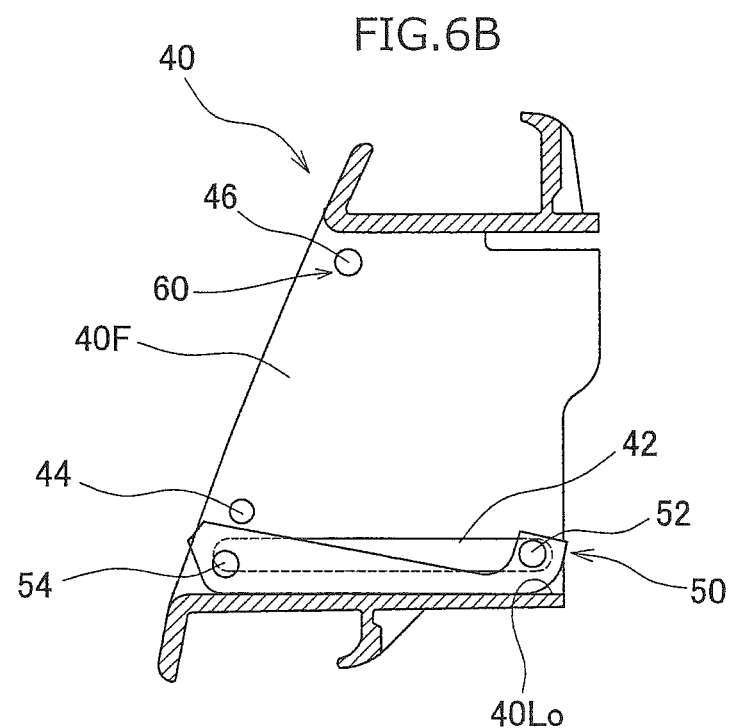

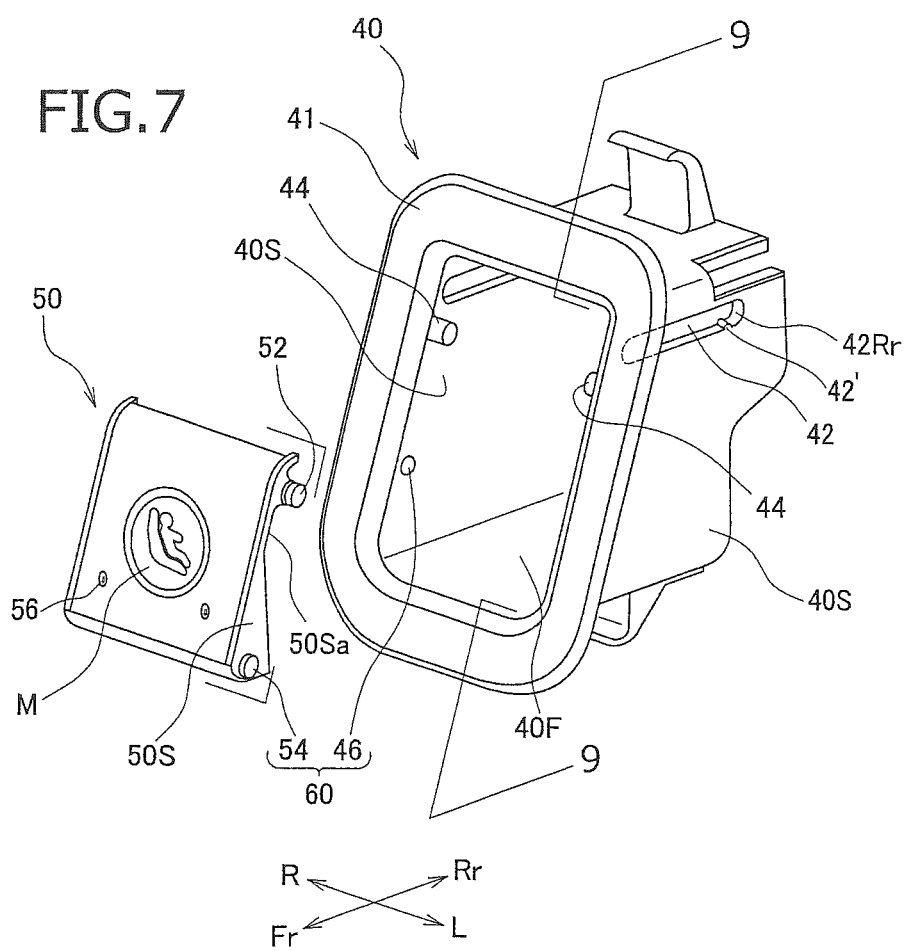

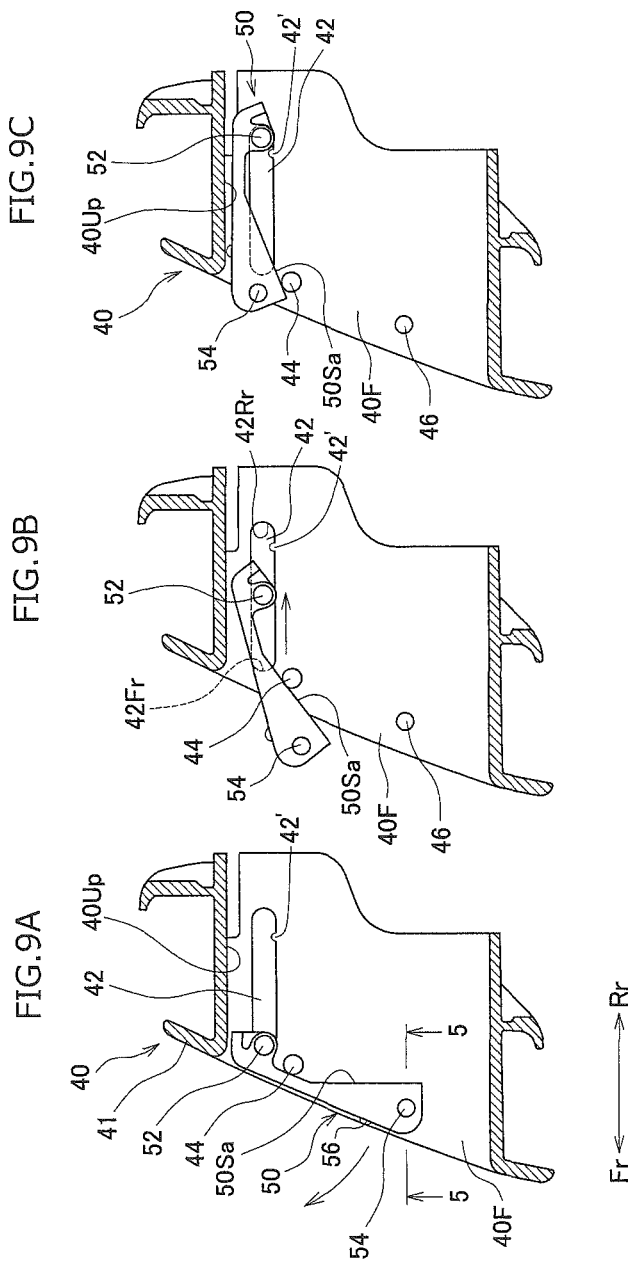

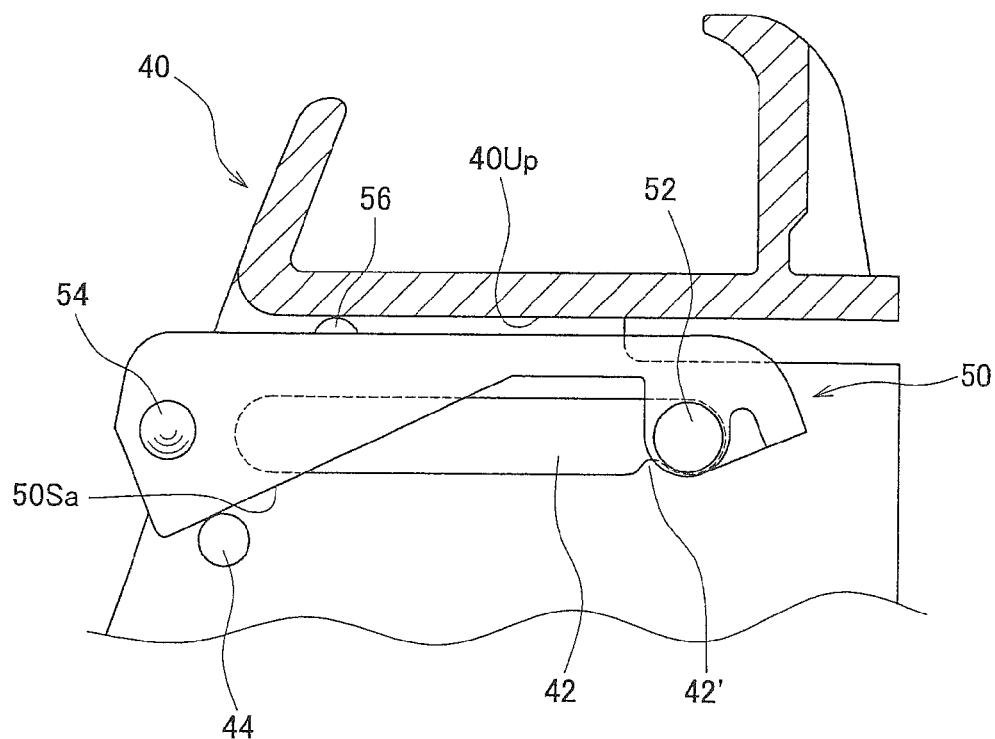

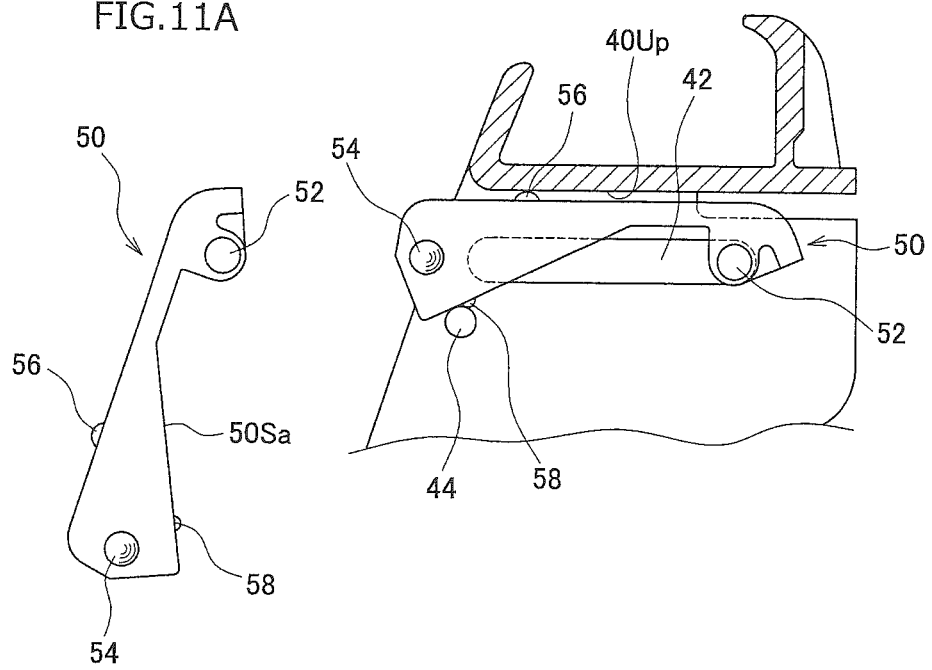

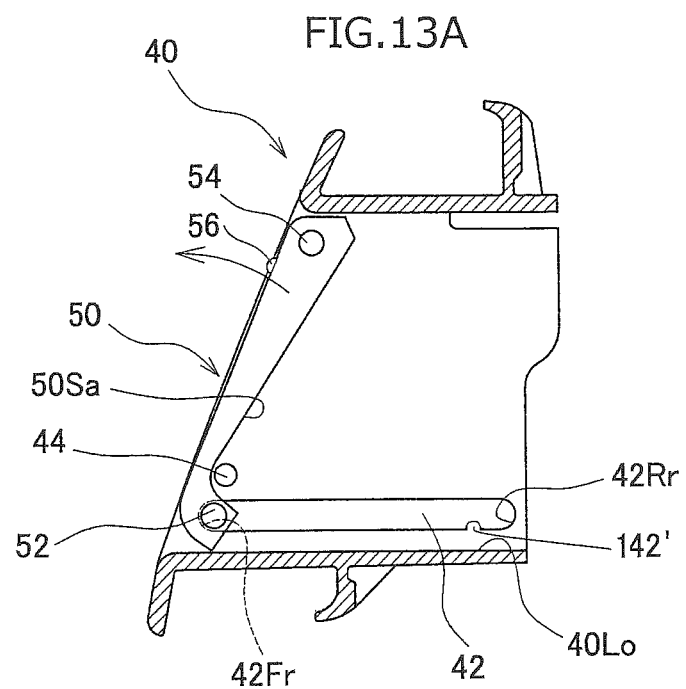
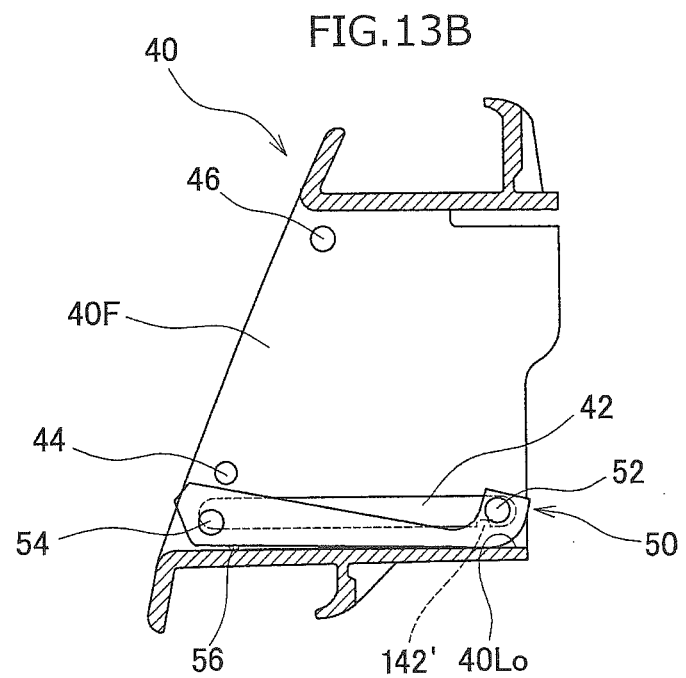

VEHICLE SEAT

CROSS-REFERENCE TO RELATED APPLICATIONS

This application is based upon and claims the benefit of priority from the prior Japanese Patent Application Nos. 2013-197695 and 2013-223801, filed Sep. 25 and Oct. 29, 2013, respectively, the entire contents of which are incorporated herein by reference.

BACKGROUND OF THE INVENTION

1. Field of the Invention

This invention relates to a vehicle seat that has ISO-FIX anchors, which can hold the ISO-FIX type child seat.

2. Description of the Related Art

International standard ISO-FIX is known as a system for holding the ISO-FIX type child seat to a vehicle seat. A vehicle seat that has ISO-FIX anchors for holding the ISO-FIX type child seat is disclosed in, for example, JP 2008-105580A.

Any ISO-FIX type child seat has left and right engaging members at the rear. The anchors (i.e., ISO-FIX anchors) for receiving the engaging members may be arranged at the rear end of the seat cushion or at the lower end of the seat back of a vehicle seat.

One type of an anchor is known, which is a wire member bend in the form of letter U. The wire member is composed of left and right side bars parallel to each other, and a front bar connecting the side bars at front end. Any child seat has, at the lower part of its back, left and right engaging members extending backward. Either engaging member is forked into two arms, as seen from the side. The arms define a long, slit-shaped cut (engaging port). As long as the front bar of the wire member is set in the engaging ports of the left and right engaging members, the anchor holds the child seat to the vehicle seat. In most cases, the lower arm of the forked engaging member is shorter than the upper arm, enabling the engaging member to engage with the front bar smoothly.

In most vehicle seats, the anchors are provided at the rear end of the seat cushion or at the lower end of the seat back. Both the seat cushion and the seat back are composed of a seat cushion frame, i.e., main component, a pad (seat pad) made of, for example, urethane foam and covering the seat cushion frame, and a trim cover covering the pad. The pad has recesses, in which the anchors are arranged, respectively. In the case where the anchors are provided at the rear end of the seat cushion, the seat cushion frame is shaped rectangular as viewed from above, composed of left and right side frames and, for example, front and rear connecting pipes connecting the side frames at front and rear ends. The anchors are secured to the rear connecting pipe and arranged in the pad recesses.

If the pad recesses and the anchors arranged in the pad recesses, respectively, are seen, the vehicle seat is impaired in outer appearance. It is therefore proposed that two box-shaped bezels should cover and conceal the pad recesses, respectively.

While the child seat is not secured to the vehicle seat, the opening of either bezel may be covered with a cap. In this case, the anchors arranged in the pad recesses are unseen from outside, and would not impair the outer appearance of the vehicle seat. If the cap is made removable from the bezel and is removed from the bezel, however, it will probably be lost. This is why the cap is swingably attached to the bezel in most cases.

JP 2008-105580A, for example, discloses a vehicle seat. In this vehicle seat, either bezel covers a pad recess, the opening of the bezel is covered with a swingable cap, and either anchor extends to the pad recess through the hole made in the bottom wall (back) of the bezel.

In this configuration, the bezel conceals the pad recess. While the child seat remains unused, the cap covers the pad recess, concealing the anchors arranged in the pad recesses. This prevents the outer appearance of the vehicle seat from being impaired. To secure the child seat to the vehicle seat, the caps are swung, exposing the anchors, and the anchors are engaged with engaging members of the child seat. The child seat is thereby secured to the vehicle seat.

German Utility Model Publication DE20006692U1 discloses a cap that can be stored in a bezel. This cap has left and right walls extending backwards from the center of the back, and is T-shaped as viewed from the side. The cap has two pairs of hinge pins protruding from the left and right side walls, respectively, and spaced a little from each other in the front-back direction. The left and right grooves are cut in the left and right inner surfaces of the bezel and extend in the front-back direction, respectively. The hinge pins of the cap are fitted in the guide grooves and can slide in the guide grooves. The bezel incorporates a leaf spring, which pushes the front hinge pin to the front end of the guide groove. The cap is thereby held at a position where it covers the opening of the bezel. Since the hinge pins spaced in the front-back direction are fitted in the guide grooves, the cap is held without rotating, by virtue of the bias of the leaf spring, at the position where it covers the opening of the bezel.

To secure the child seat to the vehicle seat, the engaging members of the child seat are pushed into the pad recess. At this point, the engaging members push the caps, against the bias of leaf springs. The hinge pins of the cap are therefore slide along the guide grooves of the bezel. The guide grooves are arcing up, gradually toward the rear ends. Therefore, the cap rotates around the hinge pins, jumping up, as the hinge pins are pushed by the engaging member and slide along the guide grooves. The cap moves from the distal end of the engaging member onto the upper surfaces thereof. The cap is thus pushed to the upper surface of the engaging member, because of the bias of the leaf spring. As a result, the cap is stored in the bezel, with the rear hinge pin abutting on the rear end of the guide groove.

The vehicle seat described in JP 2008-105580A must have a means for swinging the cap to secure the child seat to the vehicle seat and holding the cap in the swung position. Further, a space must be provided around the opening of the bezel in order to allow the cap to swing in a specific locus. Inevitably, the components provided around the opening of the bezel are restricted in not only shape, but also position.

The cap disclosed in German Utility Model Publication DE20006692U1 is swung jumps up when the engaging member of the child seat is pushed into the pad recess. The cap is then held in the bezel, while being pushed to the upper surfaces of the engaging members. Therefore, fixing means is not necessary and any space need not be provided around the opening of the bezel to allow the cap to swing in a specific locus. Hence, the components provided around the opening of the bezel are not restricted in shape or position.

Moreover, the vehicle seat looks better because the cap is stored in the bezel as long as the child seat is secured to the vehicle seat. In addition, the cap is hardly broken because no external force is applied to it.

To secure the child seat to the vehicle seat, however, the distal ends of the engaging members are pushed into the bezels, and the front surfaces of the cap is pushed onto the upper surface of the engaging member, against the bias of the leaf springs. As the bias of the leaf spring pushes the cap, at front surface, onto the upper surfaces of the engaging member, the cap jumps up, while sliding on the upper surface of the engaging member, and is stored into the pad recess. To release the child seat from the anchors, the engaging members are pulled from the pad recesses. As the engaging members are pulled from the pad recesses, the front surface of the cap slides on the upper surfaces of the engaging member, while being pushed onto the upper surface of the engaging member with the bias of the leaf spring, and finally reaches the distal end of the engaging members. Thus, the cap is pushed, at front surface, to the distal end of the engaging member with the bias of the leaf spring, and therefore returns to a position, where it covers the opening of the bezel.

So pushed into the pad recesses, the engaging members of the child seat have their distance ends pushed onto the front surface of the caps, against the bias of the leaf spring. The cap inevitably jumps up, sliding on the upper surface of the engaging member. To release the child seat from the anchors, too, the engaging members are pushed onto the front surface of the cap, jumping the cap up. The front surface of the cap is inevitably damaged as it contacts the engaging member, possibly impairing the outer appearance of the cap. If the ISO-FIX anchor marks (pictographs) are drawn on the front surface of the cap, the front surface of the cap will be roughened. Therefore, it is difficult to put the marks (pictographs) to the front surface of the cap.

The leaf spring is bent and secured, at one end, to the bezel, and is clamped, at the other end (free end), between two pins provided on the back of the cap. The cap therefore remains inclining a little backward, covering the opening of the bezel, while the child seat remains not secured to the vehicle seat.

The leaf spring is an indispensable component, increasing the number of components constituting the vehicle seat. The leaf spring is fixed at one end, holding the cap in the same state as a cantilever bent. Hence, its other end (free end) can hardly be positioned to set the cap at a position where the cap covers the opening of the bezel, while inclining at a specific angle. Inevitably, the vehicle seat is complex in configuration.

The leaf spring pushes the cap, at front surface, to the upper surfaces of the engaging member, storing the cap in the bezel. The cap therefore would not rattle, making no noise, even while the vehicle is running.

SUMMARY OF THE INVENTION

An object of this invention is to provide a vehicle seat in which the cap is stored in the bezel, without being damaged, particularly at the front surface that covers the opening of the bezel.

In this invention, the cap is held, not applied with any bias, at a position where it covers the opening of the bezel. If the cap is first pulled, then swung and finally pushed, it is controlled by the control pins provided on the bezel, then jump up, for example, and is stored in the bezel.

In this invention, a vehicle seat having an anchor for holding a child seat, a pad having a recess, a trim cover covering the pad, a bezel provided in the recess and having an opening, and a cap covering the opening of the bezel, wherein guide grooves extending straight in a front-back direction are provided in left and right sides of the bezel; a holding means is provided between the bezel and the cap, for holding the cap at a position where the cap covers the opening of the bezel; control pins protrude from the left and right sides of the bezel to abut on a back of the cap covering the opening of the bezel, thereby to control the cap being swung into the bezel; and as a force is applied to the cap covering the opening of the bezel to push hinge pins into the guide grooves, the back of the cap slides on the control pins, swinging the cap around the hinge pins, moving the cap up and storing the cap into the bezel.

BRIEF DESCRIPTION OF THE DRAWINGS

FIGS. 1 to 3, FIGS. 4A to 4C, FIG. 5 and FIGS. 6A and 6B show a vehicle seat according to an embodiment (Embodiment 1) of the present invention;

FIG. 1 is a side view of the vehicle seat;

FIG. 2 is a schematic, perspective view showing the bezel and the cap, used in the vehicle seat;

FIG. 3 is a right side view, showing the bezel and the cap;

FIG. 4A is a sectional view taken along line 4-4 in FIG. 2, showing the cap at the initial position (where the cap covers the opening of the bezel);

FIG. 4B is a sectional view taken along line 4-4 in FIG. 2, showing the cap at the intermediate position;

FIG. 4C is a sectional view taken along line 4-4 in FIG. 2, showing the cap at the storage position;

FIG. 5 is a sectional view taken along line 5-5 in FIG. 4A and FIG. 9A;

FIG. 6A is a sectional view of the bezel and the cap, used in an modification (Modification 1) of the invention, the cap assuming the initial position shown in FIG. 4A;

FIG. 6B is a sectional view of the bezel and the cap, used in an modification (Modification 1) of the invention, the cap assuming at the storage position shown in FIG. 4C;

FIG. 7, FIG. 8, FIGS. 9A to 9C, FIG. 10, FIGS. 11A and 11B, FIGS. 12A and 12B, and FIGS. 13A and 13B show a vehicle seat according to another embodiment (Embodiment 2) of the present invention;

FIG. 7 is a schematic, perspective view showing the bezel and the cap, used in Embodiment 2;

FIG. 8 is a right side view showing the bezel and the cap, used in Embodiment 2;

FIG. 9A is a sectional view taken along line 9-9 in FIG. 7, showing the cap at the initial position (where the cap covers the opening of the bezel);

FIG. 9B is a sectional view taken along line 9-9 in FIG. 7, showing the cap at the intermediate position;

FIG. 9C is a sectional view taken along line 9-9 in FIG. 7, showing the cap at the storage position;

FIG. 10 is a magnified view of the cap and the upper half of the bezel at the storage position of the cap (FIG. 9);

FIG. 11A is a right side view of the cap used in a modification (Modification 1) of this invention;

FIG. 11B is a sectional view showing the bezel, showing the cap assuming the same storage position as shown in FIG. 9C;

FIG. 12A is a sectional view of the cap and the upper half of the bezel used in another modification (Modification 2) of this invention;

FIG. 12B is a sectional view of the upper half of the bezel, showing the cap assuming the same storage position as shown in FIG. 9C;

FIG. 13A is a sectional view of the bezel and the cap, used in another modification (Modification 3) of this invention; and FIG. 13B is a cross sectional view showing the bezel and the cap assuming the same storage position as shown in FIG. 9C.

DETAILED DESCRIPTION OF THE INVENTION

Embodiment 1

Figure 1:
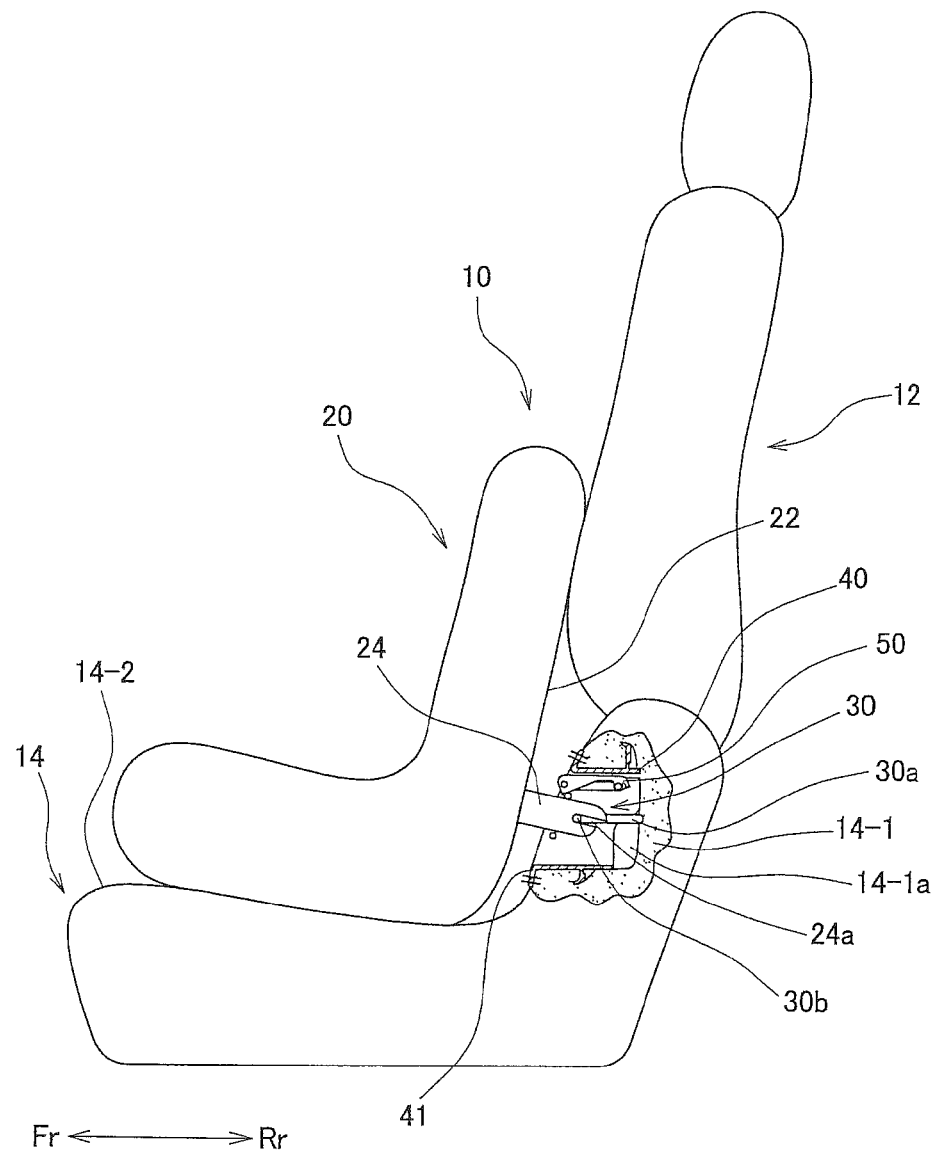

Embodiment 1 of this invention will be described, with reference to FIGS. 1 to 3, FIGS. 4A to 4C, FIG. 5 and FIGS. 6A and 6B.

In the drawing, Fr and Rr indicate the forward and backward directions with respect to the occupant seated in the driver seat, and L and R indicate the leftward and rightward directions with respect to the occupant.

As shown in FIG. 1, the vehicle seat 10 comprises a seat back 12 and a seat cushion 14. A seat belt (not shown) is secured to the vehicle seat. The seat cushion 14 comprises a cushion frame (not shown), a pad (seat pad) 14-1, and a trim cover 14-2. The pad 14-1 is made of foamed urethane and covers the cushion frame. The trim cover 14-2 covers the pad. The seat back 12 has a configuration similar to that of the seat cushion 14.

The pad 14-1 is cut at the rear end of the seat cushion 14, providing pad recesses 14-1a. A trim cover (not shown) covers the pad, and has an opening above the pad recesses. As shown in FIG. 1, the pad recess 14-1a is provided at the rear end of the seat cushion. Instead, the pad recesses may be provided at the lower end of the seat back 12.

At the rear end of the seat cushion 14, for example, left and right anchors 30 are arranged to hold an ISO-FIX type child seat 20. The anchors 30 are spaced apart by a prescribed distance in the left-right direction of the vehicle seat 10.

The child seat 20 has left and right engaging members 24, which extend backward from the lower part of the back 22 of the child seat 20. The engaging members 24 have an engaging port 24a, each, which is an elongated slit. Each anchor 30 is U-shaped as viewed from above, is formed by bending a wire, and is composed of left and right side bars 30a extending forward in parallel to each other, and a front bar 30b connecting the forward ends of the side bars 30a. The anchor 30 is secured to a connecting pipe (not shown) that extends between the rear ends of the side frames (not shown) of the seat cushion, and extend forwards.

How the child seat 20 is secured to the vehicle seat 10 will be explained. First, the child seat 20 is held with its back inclined. The child seat 20 is then moved toward the anchors 30 until the front bar 30b is fitted into the engaging ports 24a (i.e., slits) of the engaging members 24. The child seat 20 is thereby held by the anchors 30 and arranged on the seat cushion 14. The front bar 30b of either anchor is thus fitted in the entire engaging port 24a, from end to end thereof. Therefore, the anchors 30 perfectly hold the child seat 20 to the vehicle seat 10.

Two box-shaped bezels 40, each opening at front and having a rectangular cross section, cover the pad recesses 14-1a, respectively. A cap 50 is attached to either bezel 40, covering the opening (front opening) 40F. The bezels 40 and the caps 50 are made of, for example, thermoplastic resin.

In Embodiment 1, either bezel 40 has a flange 41 made integral and surrounding the opening 40F. The bezel 40 is not limited to this configuration. Nevertheless, the bezel can be easily secured to the trim cover by first arranging those parts of the trim cover, which surround the pad recesses 14-1a, on the lower surface of the flange 41, and then sewing said parts of the trim cover together with the flange.

The bezel 40 opens not only in the front, but also at the back. The bezel 40 may cover the anchor 30, respectively. Once covered with the bezel 40, either anchor 30 is positioned in the bezel 40, extending therein. As long as the cap 50 covers the opening 40F of the bezel 40, respectively, the anchor is concealed, the position can hardly be determined. An ISO-FIX anchor mark M (pictograph) should therefore be better drawn on the front surface of either cap (see FIG. 2), to indicate the position the anchor 30 assumes in the cap.

The bezel 40 may have a bottom wall at the back, and an insertion hole may be made in the bottom wall. In this case, the anchor 30 protrudes into the bezel 40 through the insertion hole.

Figure 3:
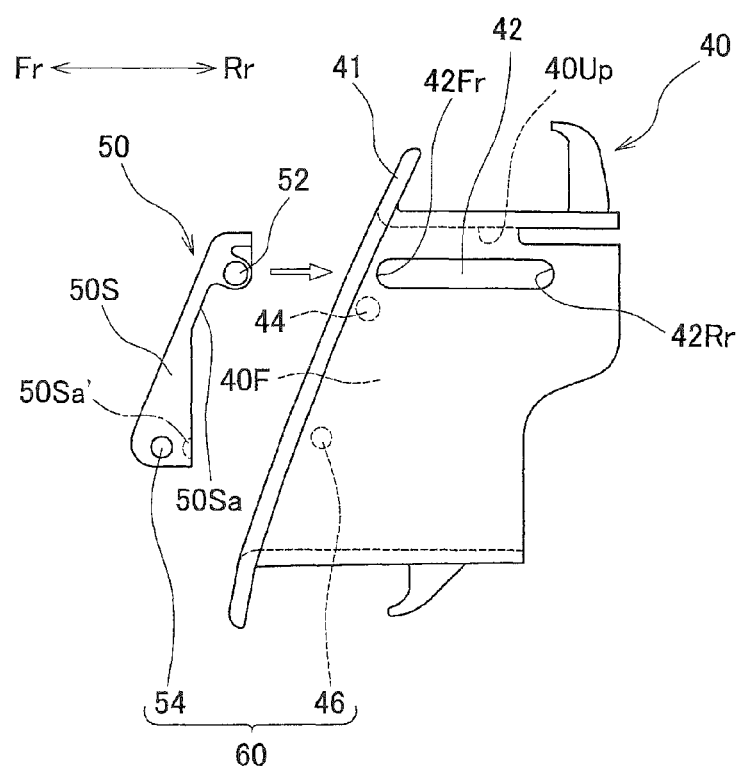

As shown in FIG. 3, the front of either bezel 40 inclines, with the lower edge positioned more forward than the upper edge. The cap 50 is U-shaped as viewed from above, each having left and right faces (side faces) 50S.

Figure 2:
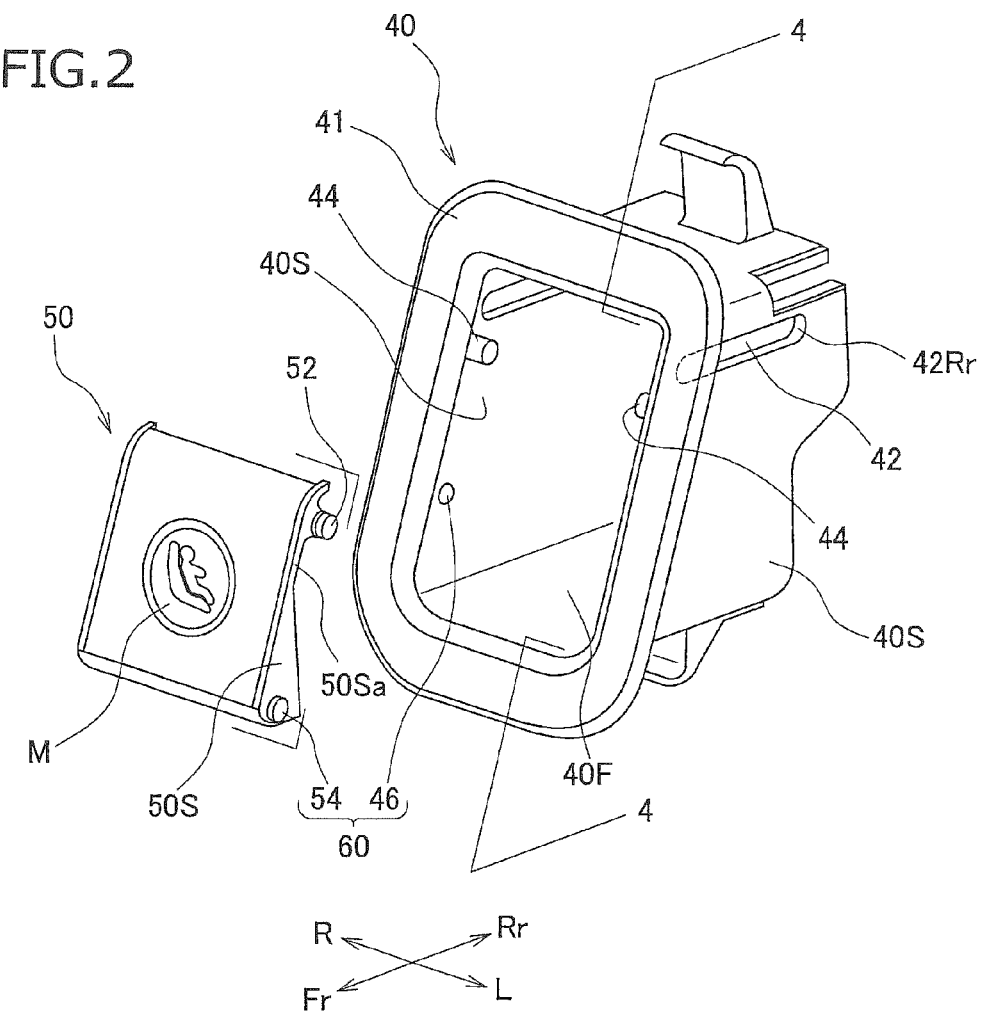

As seen from FIG. 3 and also from FIG. 2, the right and left sides 40S of either bezel 40 have a guide groove 42 each, which extends straight in the front-back direction. Two hinge pins 52 protrude outward from the upper parts of the left and right faces 50S, respectively, are fitted in the guide grooves 42, and can slide along the guide grooves, respectively. Further, either cap 50 is secured to the bezel 40, with the hinge pins 52 fitted in the guide grooves 42, respectively. (That is, the caps are incorporated in the bezels 40, respectively.)

The guide grooves 42 are slits that extend almost horizontally in the front-back direction. The guide grooves 42 are spaced from the ceiling (upper surface) 40Up of the bezel 40 by the distance equal to the length (or thickness) of the cap 50. A space for storing the cap 50 is therefore provided below the ceiling 40Up.

Below and in front of the front ends 42Fr of the guide grooves 42, left and right control pins 44 protrude inward from the left and right sides 40S of the bezel 40. As the control pins abut on, for example, the backs 50Sa of the left and right faces 50S, they control the swing of the cap 50.

The control pins 44 and the hinge pins 52 are shaped like, for example, solid cylinders.

The control pins 44 only needs to abut on the back of the cap 50 to control the swing of the cap. In view of this, the control pins need not abut on the backs of the faces 50S. However, the cap 50 having the left and right faces 50S is U-shaped as viewed from above, and the control pins 44 abut on the back of the cap at the back of the left and right faces with the same force. Therefore, the cap 50 is hardly twisted, and the hinge pins 52 can smoothly slide along the guide grooves 42. In addition, the control pins 44 are short, not making the anchor 30 complex in configuration.

Figure 5:
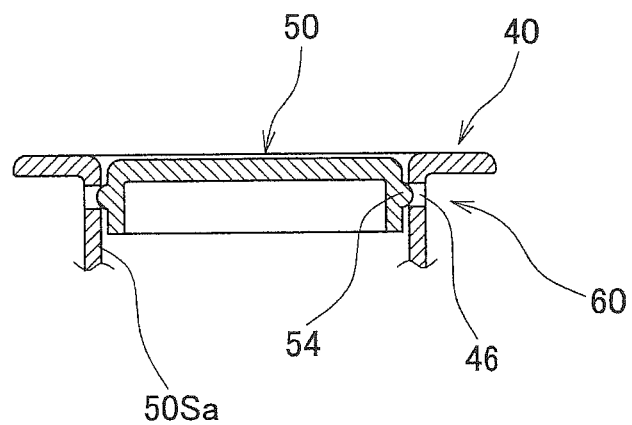
Figure 8:
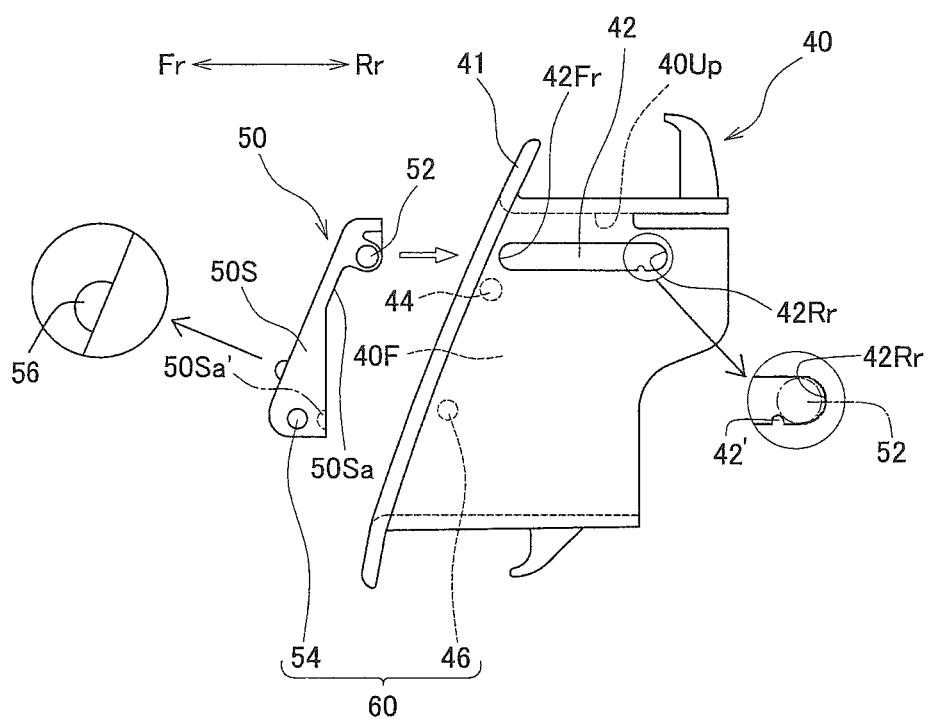

As may be seen from FIG. 4A, FIG. 4B, FIG. 4C and FIG. 5, a holding means 60 is provided between the bezel 40 and the cap 50. The holding means 60 is positioned, covering the opening of the bezel. The holding means 60 is composed of a pair of engaging projections 54 and a pair of engaging holes 46. The engaging projections 54, or left and right projections, protrude outward from the lower parts of the left and right faces 50S, respectively. The engaging holes 46, or left and right engaging holes, are made in the left and right sides 40S of the bezel under the control pins 44, respectively. As shown in FIG. 5, the engaging projections 54 have a semi-spherical part, respectively. The engaging holes 46 are through holes made in the sides 40S of the bezel 40. Once the engaging projections 54 are fitted (engaged) in the engaging holes 46, the cap is held in the bezel. The through holes may be replaced by semi-spherical recesses that are complimentary, in shape, to the engaging projections 54.

The holding means 60 only need to hold the cap 50 at the position where the cap 50 covers the opening 40F of the bezel 40. Thus, the holding means 60 is not limited to the combination of the engaging projections 54 and the engaging holes 46. Nonetheless, the holding means 60, which is composed of the engaging projections 54 and engaging holes 46, is not only simple in configuration, but also can fast and easily hold the cap at the position where the cap covers the opening 40F of the bezel 40.

As shown in FIG. 3, for example, the cap 50 may be aligned with the opening 40F of the bezel 40 and may then be pushed in the direction of arrow Rr (or backwards). In this case, the engaging projections 54 are fitted in the engaging holes 46 made in the sides of the bezel. The cap 50 is therefore held at a position, where it covers the opening 40F of the bezel 40. As a result, the cap conceals the anchor 30 provided in the bezel 40.

If the cap 50 is pushed into the bezel 40, the engaging projections 54 are engaged in the engaging holes 46 made in the sides of the bezel 40, and the hinge pins 52 are fitted in the guide grooves 42. The cap 50 is therefore secured to the bezel 40, covering the opening 40F of the bezel 40. (That is, the cap is secured at the initial position shown in FIG. 4A.) The engaging projections 54, now located at the lower half of the cap 50, are fitted in the engaging holes 46 made in the sides of the bezel 40. Further, the hinge pins 52, now located at the upper half of the cap, are fitted in the guide grooves 42 made in the sides of the bezel. The cap 50 is therefore secured to the bezel at two positions, i.e., upper and lower positions. Therefore, the cap 50 is reliably held at its initial position, covering the opening 40F of the bezel 40.

The cap 50 is thus held at the initial position, not assisted by an independent member such as a leaf spring. Hence, the number of components constituting the vehicle seat 10 will not increase. The bezel 40 will not be more complex in configuration.

While the cap 50 remains in the initial position (see FIG. 4A) where it covers the opening 40F of the bezel 40, the hinge pins 52 of the cap are fitted in the guide grooves 42 of the bezel 40, and the engaging projections 54 of the cap are fitted in the engaging holes 46 of the bezel 40. At this point, the back 50Sa of the cap 50 abuts on the control pins 44 of the bezel. As a result, the hinge pins 52 are pushed onto the front ends 42Fr of the guide grooves 42, respectively. Namely, the hinge pins 52, guide grooves 42, control pins 44, engaging projections 54 and engaging holes 46 are so positioned that these events take place.

As described above, the control pins 44 control the backward motion (swing) of the cap 50, and the hinge pins 52 control the forward motion (swing) of the cap as they are pushed to the front ends 42Fr of the guide grooves 42. The cap 50 can therefore be held without rattling. Thus, the cap 50 would not make noise, even while the vehicle is running.

Even if a force is applied to the lower part of the cap 50 as the cap is pushed into the bezel 40, the control pins 44, which are located below the hinge pins 52, abut on the backs 50Sa of the left and right faces 50S. Therefore, the cap 50 is not swung around the hinge pins 52. The cap 50 is therefore held at its initial position, not pushed into the bezel 40.

In this invention, the cap 50 cannot be stored if it is pushed only. The cap 50 must be first pulled out and then swung upward before it is pushed. More precisely, as indicate by the arrow shown in FIG. 4A, the cap 50 is pulled and pushed into the bezel 40, while being swung up or jumped up. The cap 50 is thus moved from the position (initial position) where it covers the opening 40F of the bezel. In the bezel 40, the engaging members 24 of the child seat are engaged with the anchors 30. The child seat 20 is thereby secured to the vehicle seat 10.

How the cap 50 is stored will be explained in detail. As shown in FIG. 4A, the cap 50 covers the opening 40F of the bezel 40, leaving a space below it. Therefore, the user's finger is inserted in the space and can be engaged with the lower end of the cap 40. If the cap 50 is pulled forward as indicated by the arrow, the engaging projections 54 of the cap are pulled out of the engaging holes 46 of the bezel 40. In this case, the cap 50 may be pulled up and then pushed, at its upper end, into the bezel 40. The hinge pins 52 slide along the guide grooves 42. As shown in FIG. 4B, the cap 50 moves onto the control pins 44, swings around the control pins, and jumps up.

Although a space remains below the cap 50, the anchor 30 is positioned deep in the bezel 40 and cannot be seen from outside. The vehicle seat is therefore not impaired in outer appearance. The cap 50 can, of course, be so shaped to cover the entire opening 40F of the bezel 40. In this case, a finger rest (groove) may be made in a lower part of the front surface of the cap 50.

The back 50Sa of the cap 50 that abut on the control pins 44, respectively, have an upper part (⅓ to ¼ of overall length), which is parallel to the front surface of the cap, and can therefore first ride on the control pins 44, smoothly swing around the control pins and then jump up. The other part of the back 50Sa has an inclining guide surface (cam surface), gradually leaving the front surface of the cap toward the lower end of the cap.

When the cap 50 jumps up until the rear edge of its back 50Sa rides onto the control pins 44, the hinge pins 52 sliding along the guide grooves 42 abut on the rear edges 42Rr of the guide grooves, and are stopped. At this point, the front surface of the cap 50 is a little spaced from the ceiling (upper surface) 40Up of the bezel 40, and the lower end of the cap is substantially flush with the opening 40F of the bezel 40. The cap 50 is thus stored in the bezel 40 (see FIG. 4C).

Once so pushed into the bezel 40, the cap 50 swings, jumps up and is stored in the bezel, while controlled by the control pins 44 of the bezel, no matter whether the engaging members 24 are pushed or not. To secure the child seat 20 to the vehicle seat 10, the anchor 30 (more precisely, the front bar 30b) stored in the bezel may be pushed into the bezel 40. Even in this case, the cap 50 remains stored in the bezel, not in the path in which the engaging members 24 are pushed. Therefore, the engaging members 24 do not push the front surface of the cap 50, not contacting the front surface of the cap 50 at all.

The engaging members 24 do not push or contact the front surface of the cap 50 as they are pushed into the bezel 40. Therefore, the engaging members 24 would not damage the front surface of the cap 50. Thus, the cap 50 is not impaired in outer appearance. The cap 50 is not damaged, also because it is stored with its front surface spaced from the ceiling 40Up of the bezel 40.

Since the engaging members 24 do not push or contact the front surface of the cap 50, the ISO-FIX anchor mark M drawn on the front surface of the cap 50 is seen, indicating the position of the anchor 30.

The cap 50 swings in the bezel 40, it is therefore unnecessary to provide a space around the opening 40F of the bezel. The components, which are arranged surrounding the opening of the bezel, are therefore limited in neither shape nor position.

The cap 50 has its hinge pins 52 abutting on the rear ends 42Rr of the guide grooves 42 of the bezel 40. The cap 50 rides on the control pins 44 of the bezel 40, right below the ceiling 40Up of the bezel. The cap 50 can therefore be held at its storage position, not moving from the storage position.

The back 50Sa of the cap 50 may be inclined, if necessary, with the lower edge of the front surface lying above the upper edge thereof. Alternatively, the straight guide grooves 42 may be inclined, not horizontally extending in the front-back direction, with their rear ends 42Rr lying below their front ends 42Fr. In either case, the cap 50 is prevented from moving from the storage position.

Moreover, two engaging notches 50Sa' may be cut in the backs 50Sa of left and right faces 50S, respectively, as indicated by a one-dot, dashed line in FIG. 3. In this case, the cap 50 hardly moved from the storage position if the control pins 44 are held in the engaging notches while the cap stay at the storage position. The cap 50 can therefore be reliably held at the storage position. The engaging notches 50Sa' are shaped like, for example, an arc.

While the child seat 20 remains secured to the vehicle seat 10, the cap 50 is stored in the bezel 40 and receives no external force. The vehicle seat 10 therefore looks well, and the cap 50 is not broken.

Modification 1 of Embodiment 1

The cap 50 may be stored in the bezel 40, not in the upper part (i.e., below the ceiling), but in the lower part (i.e., above the bottom). A modification of this invention, in which the cap is stored in the bezel, in the lower part (i.e., above the bottom), will be described with reference to FIG. 6A and FIG. 6B.

In the modification, or Modification 1, the guide grooves and control pins are provided in and on the bottom of the bezel, and the hinge pins are provided below the cap, because the cap is stored in the lower part (i.e., above the bottom) of the bezel.

More specifically, the guide grooves 42 are provided in the lower parts of the bezel 40. Left and right hinge pins 52 provided on the lower part of the cap 50 are fitted in the guide grooves 42, respectively, and can slide in the guide grooves. The guide grooves 42 extend horizontally, spaced from the lower surface of the bezel by the distance equal to the length (thickness) of the cap, as measured in the front-back direction. A space is thereby provided for storing the cap 50 above the lower surface 40Lo of the bezel 40.

Left and right control pins 44 protrude inward from the left and right sides of the bezel 40, extending backwards from points above the front ends 42Fr of the guide grooves. A holding means 60 is provided between the bezel 40 and the cap 50. As in Embodiment 1, the holding means is composed of a pair of engaging projections 54 and a pair of engaging holes 46, in which the engaging projections 54 may be inserted. The engaging projections 54 are provided at the upper parts of the left and right faces of the cap 50, respectively. The engaging holes 46 are made on the upper parts of the left and right sides of the bezel 40, respectively.

The hinge pins 52 of the cap 50 are fitted in the guide grooves 42 of the bezel 40, respectively. The engaging projections 54 of the cap 50 are engaged in the engaging holes 46 of the bezel 40, respectively. The cap 50 is therefore held at a position (i.e., initial position shown in FIG. 6A) where it covers the front opening 40F of the bezel 40. The control pins 44 abut on the back 50Sa of cap 50, controlling the cap 50 which may freely swing around the hinge pins 52.

The cap 50 is stored in the bezel 40 in the following sequence. First, the cap 50 is pulled forward, thereby disengaged from the holding means 60. In Modification 1, no gap for finger rest is provided in the upper part of the cap 50, and the cap covers the opening 40F of the bezel 40. It should therefore be better to make an engaging groove, or finger rest, in the upper part of the front surface of the cap.

The cap 50 is swung around the hinge pins 52, while the control pins 44 are sliding on the backs 50Sa of the left and right faces of the cap. The hinge pins 52 keep sliding until they abut on the rear edges 42Rr of the guide grooves 42. As a result, the cap 50 is stored in the bezel 40, resting on the lower surface 40Lo of the bezel (storage position shown in FIG. 6B).

Modification 1, wherein the cap 50 is stored in the lower part of the bezel 40, can achieve the same advantage as Embodiment 1. That is, the cap 50 can be stored in the bezel 40, preventing the engaging members 24 from damaging the front surface of the cap.

Embodiment 2

Another embodiment of the invention, i.e., Embodiment 2, will be described with reference to FIG. 7, FIG. 8, FIGS. 9A to 9C, FIG. 10 and FIGS. 11A and 11B. The components identical to those of Embodiment 1 are designated by the same reference numbers, and will not be described. The features characterizing Embodiment 2 will be described in the main. Note that FIGS. 1 and 5 will be used again in describing Embodiment 2.

In Embodiment 2, projections 56 protrude from the front surface of the cap 50. As seen from FIG. 7 and FIG. 8, two spherical projections 56 are formed on a lower part of the front surface of the cap 50.

A stopper 42' is provided. The stopper 42' allows the cap 50 to move into bezel 40 if applied with a force. Once the cap 50 is stored in the bezel 40 and no longer pushed, the stopper 42' controls the motion of the cap, holding the cap at the storage position.

As shown in FIG. 7, FIG. 8, FIGS. 9A to 9C and FIG. 10, the stopper 42' is composed of two projections provided on the lower edges of the guide grooves 42, at the rear parts thereof. These projections hold the hinge pins 52, respectively, at the rear edges 42Rr of the guide grooves 42, controlling the motion of the cap 50. The projections 42' (i.e., stopper) on the lower edges of the guide grooves 42 allow the hinge pins 52 to over them when the cap 50 is pushed by the force. Once the cap is released from the pushing force, the projections 42' engage with the hinge pins 52, pushing them to the rear edges 42Rr of the guide grooves 42, respectively, and prevent the cap from moving toward the opening 40F of the bezel 40. So long as the stopper (projections) 42' performs the function of preventing the cap 50 from so moving and holding the cap at the storage position, it may be shaped like a solid cylinder or semi-sphere, each having a triangular or half-circular cross section. The projections (i.e., stopper) 42' on the lower edges of the guide grooves 42 may be provided on the upper edges of the guide grooves, not on the lower edges thereof, at corresponding positions.

The cap 50 can therefore be held at the initial position (i.e., the position where the cap covers the opening 40F of the bezel 40) by the holding means 60 (comprising the engaging projections 54 and engaging holes 46, shown in FIG. 5), without using independent members such as a leaf spring. Needless to say, this prevents an increase in the number of components constituting the vehicle seat 10. Moreover, the holding means 60 (comprising the engaging projections 54 and engaging holes 46) and the stopper 42' composed of projections can be formed when the bezel 40 and cap 50 are molded. The configuration is therefore simpler than otherwise.

The engaging projections 54 are engaged in the engaging holes 46 made in the sides of the bezel 40, and the cap 50 is held in the initial position (see FIG. 9A) where the holding means 60 covers the opening 40F of the bezel 40. Moreover, the control pins 44 controls the backward motion (swing) of the cap 50, and the hinge pins 52 pushed to the front ends 42Fr of the guide grooves 42 controls the forward motion (swing) of the cap 50. The cap 50 can therefore be held without rattling (see FIG. 9C). Thus, the cap 50 would not make noise, even while the vehicle is running.

The cap 50 may jump up after it has passed its intermediate position (see FIG. 9B), any may remain jumped up until its rear edges of the backs 50Sa ride onto the control pins 44. In this state, the hinge pins 52 slide along the guide grooves 42, ride (slide) over the projections (stopper) 42' protruding from the rear ends of the guide grooves 42, and abut on the rear edges 42Rr of the guide grooves. The hinge pins 52 are thereby stopped (see FIG. 9C). If the user stops pushing the cap 50 into the bezel 40, the stopper 42' prevents the hinge pins 42 from moving forward (toward the opening of the bezel).

That is, the hinge pins 52 are held and prevented from sliding forward by the projections (stopper) 42', and from sliding backward by the rear edges 42Rr of the guide grooves 42. The projections 56 protruding from the front surface of the cap 50 abut on the ceiling 40Up of the bezel 40. The front surface of the cap 50 is held at its storage position, spaced a little from the ceiling 40Up of the bezel 40 (see FIG. 9C and FIG. 10.)

The backs 50Sa have an inclining guide surface (cam surface) that gradually leaves the front surface of the cap toward the lower end of the cap. Therefore, when the backs 50Sa ride onto the control pins 44, the cap 50 is pushed up by the control pins. As a result, the projections 56 protruding from the front surface of the cap 50 are pushed up, abutting on the ceiling 40Up of the bezel 40, while the cap remains at the storage position. The cap 50 is therefore stored, clamped between the control pins 44 and the ceiling 40Up of the bezel 40.

When the engaging members 24 are pushed, they do not push the front surface of the cap 50, never damaging the front surface of the cap. The cap 50 therefore looks well. That is, the projections 56 protruding from the front surface of the cap 50 contact the ceiling 40Up of the bezel 40, and the front surface of the cap does not contact the ceiling 40Up of the bezel 40 at all. In other words, the cap 50 is stored in the bezel, with its front surface not contacting the ceiling 40Up. This is why the cap 50 is never damaged at its front surface.

The hinge pins 52 are clamped not only between the projections (stopper) 42' provided in the guide grooves 42 and the rear edges 42Rr of the guide grooves and are prevented from moving in the front-back direction. But also are the hinge pins 52 clamped between the control pins 44 and the ceiling 40Up of the bezel 40, and are prevented from moving in up-down direction. The cap 50 is therefore reliably held (stored) at the storage position in the bezel, and never rattles to make noise, even while the vehicle is running.

Modification 1 of Embodiment 2

Three modifications (Modifications 1 to 3) of Embodiment 2 will be described, with reference to FIGS. 11A and 11B, FIGS. 12A and 12B, and FIGS. 13A and 13B.

FIG. 11A and FIG. 11B show Modification 1 of Embodiment 2. In Modification 1, the stopper is not provided at the guide grooves 42, but provided at the rear end of the back 50Sa of the cap 50.

In Modification 1, two projections (first projections) 56 are provided on the front surface of the cap 50. Further, two other projections (second projections) 58 are provided on the rear end of the back 50Sa of the cap, and functions as stopper (see FIG. 11A). When the cap 50 is pushed into the bezel 40, the projections 58 moves over the control pins 44 because they are provided on the back of the cap 50. The projections 58 then come into engagement with the control pins 44, while pushing the hinge pins 52 onto the rear edges 42Rr of the guide groove 42. The projections (stopper) 58 prevent the cap 50 from moving back, holding the cap at the storage position, once after the cap 50 is released from the pushing force. As in Embodiment 1, the projections (second projections) 58 may be projections shaped like a solid cylinder or semi-sphere, each having a triangular or half-circular cross section.

If the cap 50 is pushed, into the bezel 40, the hinge pins 52 first slide along the guide grooves 42, then ride onto the control pins 44, and finally swing around the control pins, jumping upward. At the time the projections (stopper) 58 moves over the control pins 44 and are pushed into the bezel, the hinge pins 52 are pushed to the rear ends of the guide grooves 42. At the same time, the projections 56 provided on the front surface of the cap 50 are pushed to the ceiling 40Up of the bezel 40, abutting thereon. The cap 50 is thereby stored and held in the bezel 40, as shown in FIG. 11B.

When the hinge pins 52 are pushed to the rear ends 42Rf of the guide grooves 42, the projections (stopper) 58 provided on the backs 50Sa of the cap 50 come into engagement with the control pins 44 at the back thereof. The cap 50 is thereby prevented from moving forward in the front-back direction. Since the backs 50Sa of the cap 50 are an inclining guide surface (cam surface) that gradually leave the front surface of the cap toward the lower end of the cap, the cap is pushed up as its backs ride onto the control pins 44. The projections 56, which are provided on the front surface of the cap 50, are pushed to the ceiling 40Up of the bezel 40, abutting thereon. The cap 50 is therefore pushed up by the control pins 44 and pushed down by the ceiling 40Up of the bezel 40, prevented from moving in the up-down direction.

So prevented from moving in the front-back direction and up-down direction, the cap 50 is reliably held at the storage position in the bezel 40, not slipping out of the bezel. The cap 50 never rattles to make noise, even while the vehicle is running.

Modification 2 of Embodiment 2

Figure 12A:
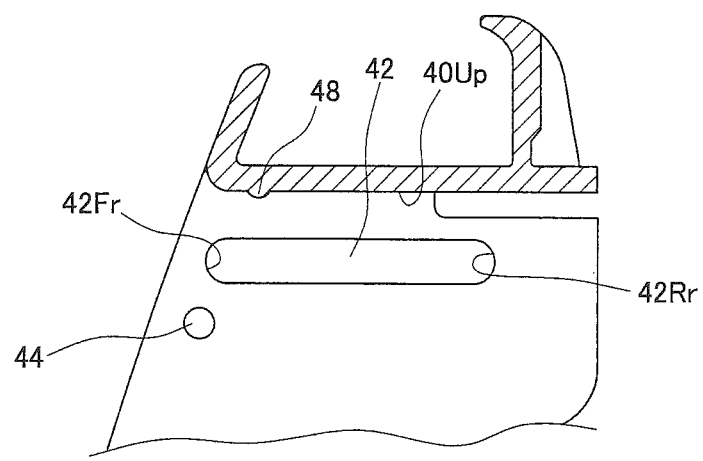
Figure 12B:
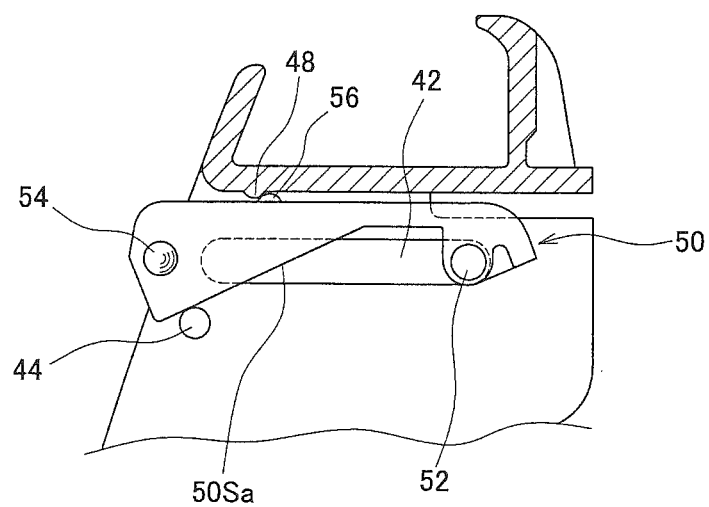

FIG. 12A and FIG. 12B show Modification 2 of Embodiment 2. In Modification 2, the stopper is not provided at the guide grooves 42, but provided on the ceiling 40Up (inner surface of top) of the bezel 40.

In Modification 2, not only projections (first projections) 56 are provided on the front surface of the cap 50, but also projections (second projections) 48 are provided on the ceiling 40Up, near the opening 40F of the bezel 40. The second projections 48 function as stopper (see FIG. 12A). As the cap 50 is pushed into the bezel 40, the projections 56 provided on the front surface of the cap 50 move over the second projections (stopper) 48 provided on the ceiling 40Up of the bezel 40. After the cap 50 is released from the pushing force, the projections (stopper) 48 keep pushing the hinge pins 52 onto the rear ends of the guide grooves 42, and engage with the projection 56, thus preventing the cap from moving back and holding the cap at the storage position. As in Embodiment 1, the projections (stopper) 48 may be projections shaped like a solid cylinder or semi-sphere, each having a triangular or half-circular cross section.

If the cap 50 is pushed, at its upper end, into the bezel 40, the hinge pins 52 slide along the guide grooves 42, then ride onto the control pins 44 and finally swing around the control pins, jumping upward. At the time the projections 56 provided on the front surface of the cap 50 move over the projections (stopper) 48 and pushed, abutting on the ceiling 40Up of the bezel 40, the hinge pins 52 are pushed to the rear ends of the guide grooves 42. The cap 50 is thereby stored and held in the bezel 40, as shown in FIG. 12B.

When the hinge pins 52 are pushed to the rear ends 42Rf of the guide grooves 42, the projections (stopper) 48 provided on the ceiling 40Up engage with the projections 56, at the back of the projections 56 provided on the front surface of the cap 50. The cap 50 is thereby prevented from moving forward in the front-back direction. The cap 50 is pushed up the control pins 44. The projections 56, which are provided on the front surface of the cap 50, are pushed to the ceiling 40Up of the bezel 40, abutting thereon. As a result, the cap 50 is clamped between the control pins 44 and the ceiling 40Up, and is prevented from moving in up-down direction.

Prevented from moving in the front-back direction and up-down direction, the cap 50 is reliably held at the storage position in the bezel 40, not slipping out of the bezel. The cap 50 never rattles to make noise, even while the vehicle is running.

Also in Embodiment 2, the cap 50 may be stored at the lower part (bottom) of the bezel 40 as in Embodiment 1 shown in FIGS. 6A and 6B.

Modification 3 of Embodiment 2

In Modification 3 shown in FIGS. 13A and 13B, the guide grooves and the control pins are provided in the lower part of the bezel, and the hinge pins are provided on the lower part of the cap. The cap is stored at the storage position in the lower part of the bezel.

As shown in FIGS. 13A and 13B, Modification 3 has a stopper composed of two projections 142' provided on the lower edges of the guide grooves 42, respectively. The projections 142' are equivalent to the projections 42' also provided on the guide grooves, and perform the same function as the projections 42'. The projections 142' may be provided on the upper edges of the guide grooves 42, not on the lower edges thereof.

The cap 50 moves, almost in the same way as shown in FIG. 7, FIG. 8, FIGS. 9A to 9C and FIG. 10, though other way around in the up-down direction. First, the cap 50 is swung around the hinge pins 52, while the hinge pins 52 are sliding on the rear ends of the left and right faces of the cap. Next, the hinge pins 52 slide along the guide grooves 42, move over the projections (stopper) 142', abut on the rear edges 42Rr of the guide grooves, and are thereby prevented from sliding further. If the cap 50 is not further pushed into the bezel 40, the hinge pins 52 are prevented from moving forward by the projections (stopper) 142' and from moving backward by the rear edges 42Rr of the guide grooves. Thus, the cap 50 is held at the storage position. Since the back 50Sa of the cap 50 is an inclining guide surface (cam surface) that gradually leaves the front surface of the cap toward the upper end of the cap, the control pins 44 push up the back 50Sa of the cap. The projections 56 provided on the front surface of the cap are therefore pushed onto the lower surface 40Lo of the bezel, abutting on the same. As a result, the cap 50 is clamped between the control pins 44 and the lower surface 40Lo of the bezel 40, and is prevented from moving in up-down direction.

In Modification 3 wherein the cap 50 is stored at the lower part (bottom) of the bezel 40, the stopper may be provided not at the guide grooves 42, but on the back 50Sa of the cap 50 as in Modification 1 or on the lower surface 40Lo of the bezel 40 as in Modification 2.

In this invention, the cap being pushed into the bezel is swung around the control pins provided in the bezel and is thereby stored in the bezel, never contacting the engaging members, no matter whether the engaging members of the child seat are pushed into the pad recesses. The cap can therefore be stored in the bezel, not damaged at its front surface.

Some embodiments of the inventions have been described, but are not intended to limit the scope of the inventions. Accordingly, various changes and modifications made without departing from the spirit or scope of the general inventive concept are, of course, all included in the present invention.

In most cases, the holding means (i.e., engaging projections and engaging holes) and the stopper composed of projections, for example, are formed when the bezel and the cap are formed. Instead, the holding means and the stopper may be formed, independently of the bezel and the cap, and may then be incorporated into the bezel and the cap, respectively, in the present invention.

In the embodiments described above, the anchors, which may engage with the engaging members of the child seat, are provided at either the rear end of the seat cushion or the lower end of the seat back. This invention is not limited to this configuration. Rather, a tether anchor may be provided at the upper surface of the seat cushion or the back of the vehicle seat. That is, this invention can be applied to a vehicle seat that has bezels, each having a cap, in which a tether anchor is provided at the back of the seat cushion and the bezels have a cap each, and the cap covers the recess in which the tether anchor may be stored.

What is claimed is:

1. A vehicle seat having an anchor for holding a child seat, a pad having a recess, a trim cover covering the pad, a bezel provided in the recess and having an opening, and a cap covering the opening of the bezel,
   wherein guide grooves extending straight in a front-back direction are provided in left and right sides of the bezel;
   a holding means is provided between the bezel and the cap, for holding the cap at a position where the cap covers the opening of the bezel;
   control pins protrude from the left and right sides of the bezel to abut on a back of the cap covering the opening of the bezel, thereby to control the cap being swung into the bezel;
   and as a force is applied to the cap covering the opening of the bezel to push hinge pins into the guide grooves, the back of the cap slides on the control pins, swinging the cap around the hinge pins, moving the cap up and storing the cap into the bezel.

2. The vehicle seat according to claim 1, wherein the bezel is box-shaped having upper, lower, left and right walls and a rectangular cross section;
   the cap has left and right walls and U-shaped as seen from above;
   the guide grooves are made in upper parts of the left and right sides of the bezel;
   the control pins are positioned in front and below the guide grooves and provided on the left and right sides of the bezel and;
   the hinge pins are provided on upper parts of the left and right walls of the cap;
   and the cap, when pushed, rides onto the control pins, sliding at a back on the control pins, swinging around the control pins, and then jumps up and stored right below a ceiling of the bezel.

3. The vehicle seat according to claim 1, wherein the bezel is box-shaped having upper, lower, left and right walls and a rectangular cross section;

the cap has left and right walls, is made of plastic material and is plate-shaped;

the guide grooves are made in lower parts of the left and right sides of the bezel;

the control pins are positioned in front and above the guide grooves and provided on the left and right sides of the bezel and;

and the cap, when pushed, slides on the control pins, is swung while being controlled, and is stored on a lower surface of the bezel.

4. The vehicle seat according to claim 1, wherein the holding means has engaging holes and engaging projections, the engaging holes are made in the left and right sides of the bezel, and the engaging projections are provided on the left and right walls of the cap, or vice versa.

5. The vehicle seat according to claim 2, wherein a lower edge of a front surface of the cap is positioned above an upper edge thereof while the cap remains stored in the bezel.

6. The vehicle seat according to claim 5, wherein the lower edge of the front surface of the cap is positioned above the upper edge thereof while the cap remains stored in the bezel.

7. The vehicle seat according to claim 5, wherein the guide grooves are linear to the front-back direction, each having a rear end located below a front end.

8. The vehicle seat according to claim 1, wherein the cap has projections provided on a front surface;

the cap is swung around the control pins, jumps up, abuts on a ceiling of the bezel and is thereby stored below the ceiling of the bezel when the hinge pins are pushed into the guide grooves and slide in the guide grooves;

and a stopper is provided, which allows the cap to move into the bezel if applied with a force and controls the motion of the cap, holding the cap at a storage position once the cap is stored in the bezel and no longer pushed.

9. The vehicle seat according to claim 8, wherein the stopper is composed of projections which are provided on lower or upper surfaces of the guide grooves, at rear parts thereof and which push the hinge pins to rear ends of guide grooves, thereby controlling motion of the cap.

10. The vehicle seat according to claim 8, wherein the stopper is provided on a back of the cap and is configured to engage with the control pins at the back thereof, thereby to control the motion of the cap.

11. The vehicle seat according to claim 8, wherein the stopper is provided on the ceiling of the bezel and is configured to engage with the projections provided on the front surface of the cap, thereby to control the motion of the cap.

\* \* \* \* \*